Sept. 5, 1950           C. H. FRASER           2,520,924
PLOTTING TRAINER

Filed April 24, 1946           2 Sheets-Sheet 1

*INVENTOR.*
CYRUS H. FRASER
BY

Attorney

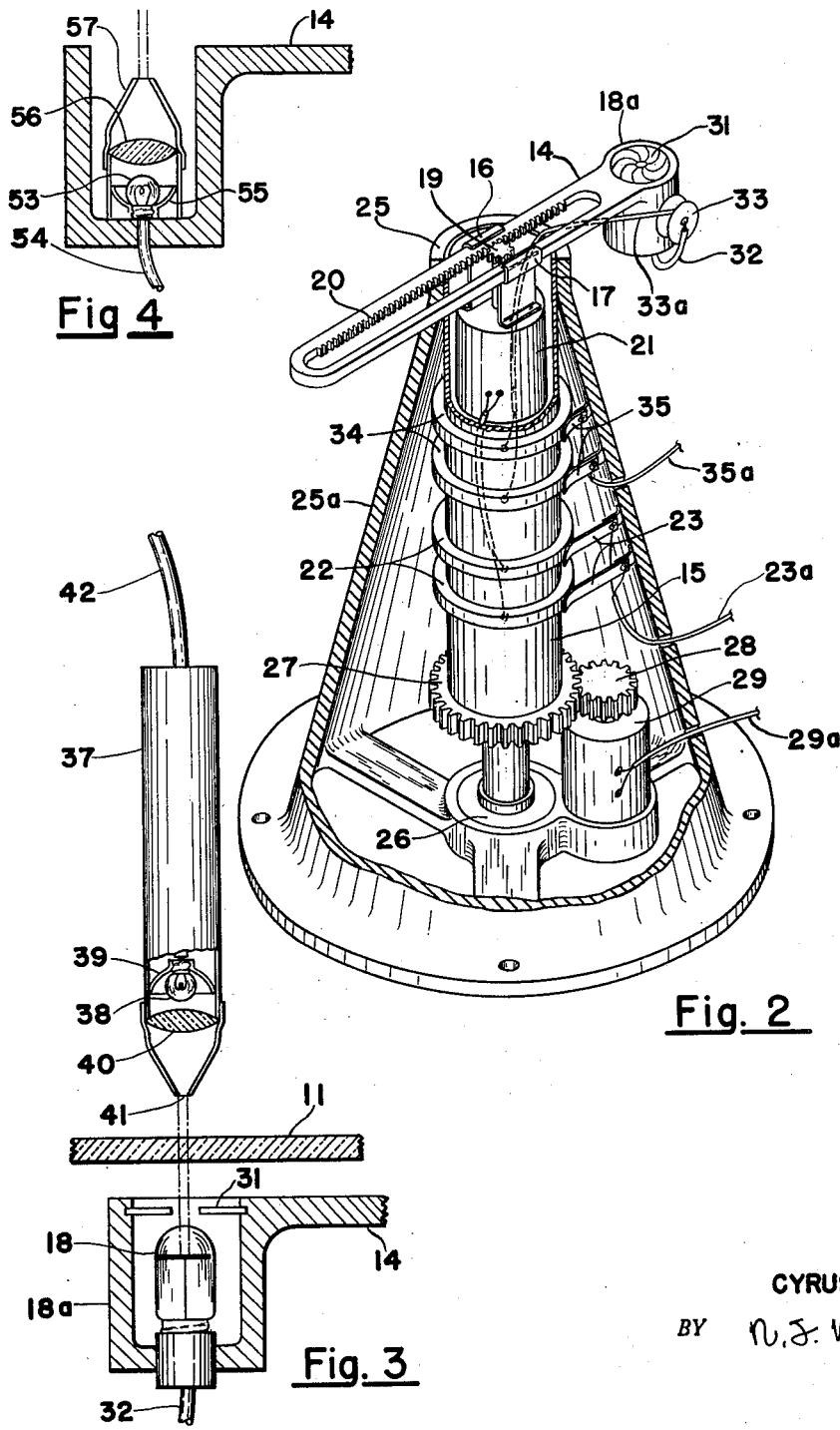
Sept. 5, 1950 — C. H. FRASER — 2,520,924
PLOTTING TRAINER
Filed April 24, 1946 — 2 Sheets-Sheet 2
INVENTOR.
CYRUS H. FRASER Patented Sept. 5, 1950

2,520,924

UNITED STATES PATENT OFFICE 2,520,924

PLOTTING TRAINER

Cyrus H. Fraser, San Diego, Calif.

Application April 24, 1946, Serial No. 664,449

6 Claims. (Cl. 35—9)

(Granted under the act of March 3, 1883, as amended April 30, 1928; 370 O. G. 757)

This invention relates to educational devices and more particularly to a plotting trainer in which the plotting is done by a pencil of light pointed at a hidden photoelectric cell.

Educational devices utilizing an electrified pointer which is touched to one of a plurality of contacts to complete a circuit are old in the art. Such devices, however, can represent only a few of the possible plotting points in an area because of the space occupied by the contacts. Furthermore, the contacts are visible and give undesirable assistance in determining the proper position. The degree of plotting accuracy required cannot be varied due to the fixed surface area of the contacts.

An object of this invention is to provide a plotting trainer which can be set to any one of an infinite number of positions by the instructor.

Another object is to provide a trainer in which the instructor positioned element is obscured from view and gives no undesirable help to the student in plotting the proper position.

Another object is to provide a trainer in which the degree of plotting accuracy required may be set to desired limits.

A further object is to provide a plotting trainer in which the actuated element is instructor positioned through remote control and whose actuation is prevented after a predetermined time.

The invention also resides in certain novel features of electro-mechanical component structure and arrangement which facilitate the carrying out of the foregoing objects and which contribute both to the simplicity of the plotting trainer and to the reliability of operation as well as to the ease and expeditious manner of setting up plotting problems.

Other objects and advantages of the invention will become apparent from the following detailed description taken in connection with the accompanying drawings, in which:

Figure 2 is a detail perspective view partly in section of the mechanism for positioning the instructor operated element.

Figure 3 is an enlarged elevation view of the light pencil and photoelectric cell.

Figure 4 shows an alternative arrangement.

Figure 1:
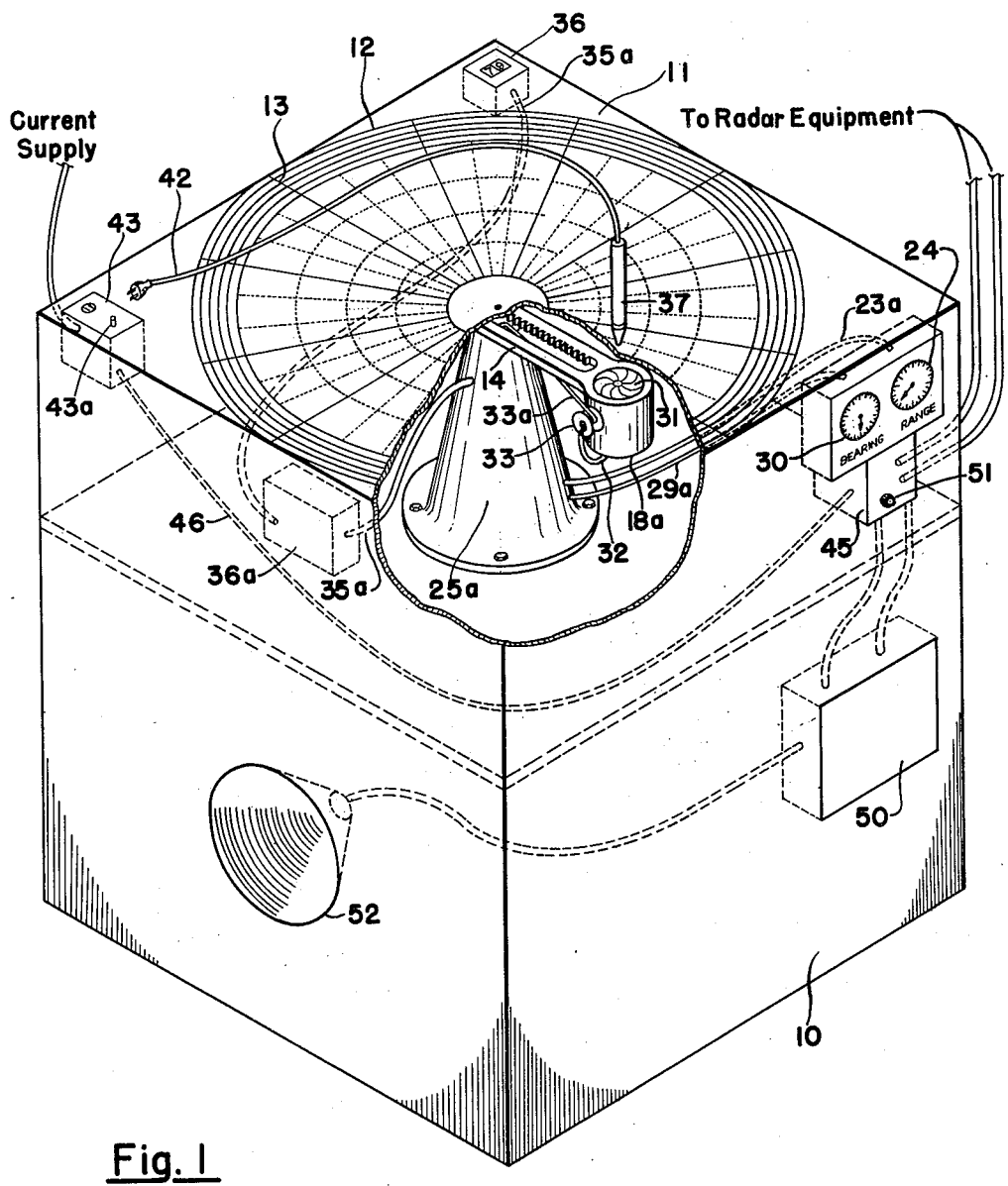
Figure 1 is a general perspective view of the device.

While the invention is susceptible of various modifications and alternative arrangements, I have shown in the drawings and will herein describe in detail the preferred embodiments. It is to be understood, however, that I do not intend to limit the invention by such disclosure for I aim to cover all modifications and alternative arrangements falling within the spirit and scope of the invention as defined in the appended claims.

Figure 1 shows a housing 10 which supports a translucent plastic plate 11 on which is duplicated an "Air Plot" such as is used in Combat Information Center equipment aboard naval vessels. Ring marks 12 indicate distances or ranges about a center and markings 13 represent bearings from 0° to 360°.

An extensible arm 14 is mounted on column 15 with guides 16 and 17 as shown in Figure 2. A photoelectric cell 18 shown in Figure 3 is mounted in the housing 18a at the outer end of arm 14. Movement in and out of arm 14 is provided by rotation of pinion 19 which engages rack 20 and is driven by synchromotor 21. Leads from motor 21 are connected to slip rings 22 which are engaged by brushes 23 which in turn are connected by cord 23a to the range control device 24.

Column 15 is rotatably mounted in collars 25 and 26. Conical member 25a supports collar 25 as well as the slip ring brushes. The column is driven through gear 27 by pinion 28 and synchromotor 29. Motor 29 is remotely controlled through cord 29a by bearing control device 30.

An iris diaphragm 31 is mounted above cell 18. The cell is connected by cord 32 to spring reel 33. Lead 33a from the reel goes to slip rings 34 which are connected by brushes 35 and cord 35a to counting device 36 through trip circuit 36a.

This trip circuit is of the time delay type and cannot be actuated by signals of very short duration.

Light pencil 37 as shown in Figure 3 consists of a small electric bulb 38 which with reflector 39 and lens 40 projects a lender parallel-ray beam through opening 41. The pencil is connected by cord 42 to current interrupter 43 which cuts off the pencil from the current supply after a desired time. Button 43a controls the timer. Power for the range and bearing controls is carried to switch unit 45 by cord 46.

Bearings and ranges may be fed into control devices 24 and 30 from a record in reproducer 50, which comprises a phonograph embodying playback equipment and having filters on the sound output of the record tracks.

Reproducer 50 is connected to range and bearing control devices 24 and 30 through switch 51. Suitable records are used in reproducer 50 to supply ranges and bearings automatically to the control devices. The reproducer is also connected to loud speaker 52. One channel is used to actuate the mechanisms for positioning the arm 14, and a synchronized second channel on the records furnishes voice impulses to the loud-speaker to announce the ranges and bearings as they are supplied to the control devices. If desired, these may be visual impulses supplied to a screen.

One preferred method of using a sound track or channel to operate the plotting mechanisms could consist in utilizing a frequency operated device, the frequency controlled by the same sound track that supplies the voice information but separated therefrom by electrical filters, said device mechanically actuating a pair of Selsyn generators which in turn would supply current to the range and bearing Selsyn motors 21, 29. There are other suitable alternative arrangements, not herein described.

In an alternative form of the invention, the photoelectric cell and iris in arm 14 are replaced by a light source 53 as shown in Figure 4. Cord 54 carries current to the light source which is mounted in reflector 55 and sends a narrow beam of light through lens 56 and cone 57.

Actual course and range information such as that obtained from radar equipment may be supplied to the range and bearing control devices. Switch 51 controls the source of data for the plotting device in either form.

The trainer is used to teach a student to plot ranges and bearings accurately. The instructor sets a desired range such as 5,900 yards on range control 24. This locates cell 18 under plate 11 at a 5,900 yard position. Transmission is through brushes 23 and rings 22 to synchromotor 21 which follows the range control, rotating pinion 19 which actuates rack 20 to move arm 14 the required amount.

The desired bearing such as 180° is set on bearing control 30. This locates cell 18 on a bearing of 180° under plate 11. This is accomplished by synchromotor 29 which follows the bearing control, rotating pinion 28, gear 27 and column 15 to swing arm 14 to the required bearing. The range remains the same because the column and arm rotate as a unit. By these range and bearing movements the cell may be located in any one of an infinite number of positions in a plane under the plate.

The student is told to plot the range and bearing corresponding to the position of the cell. This is done by aligning the light pencil 37 to point its beam substantially perpendicularly at this range and bearing on the plate 11. If the beam is pointed at the proper position it will actuate the cell through the translucent plate. This plate, however, prevents the student from seeing the cell.

The actuating impulse passes through cord 32, reel 33, lead 35a, slip rings 34, brushes 35 and cord 35a to counter 36. Each correct plot registers once on the counter. The counter may be used for grading the student. Current interrupter 43 controls the length of the session.

A predetermined time is given in which to make a plot after which the range and bearing is changed so that the student must then plot a new range and bearing. The student is prevented from hunting the answer by the time delay trip circuit 36a, which may embody any simple timing device for periodically making and breaking the circuit.

The light pencil must act on the photoelectric cell for a predetermined length of time before the circuit will trip and actuate the counter. This prevents the student from whirling his pencil of light over a large area in the hope of getting a score. This might be possible if only an instantaneous exposure of the photoelectric cell was necessary to trip the counting device. A suitable circuit is one in which electronic tubes are disposed between the photocell and the counter and connected so as not to be activated by signals of very short duration. A slow speed mechanical contrivance might be substituted adjacent the counter to actuate the latter in response to electrical impulses.

The degree of plotting accuracy required may be varied by the iris diaphragm 31. If the diaphragm is closed down to a small opening the light beam must be pointed more accurately to operate the cell. The size of the opening in the light pencil may also be varied to change the area of the light beam with a similar result.

Visible light is used in the light pencil in the preferred form. Invisible light, however, such as infra-red or ultra-violet radiation may also be used. Likewise, other forms of energy, such as magnetism, might be used to actuate the instructor operated element.

It is desirable that the light pencil be in proximity to the plate when pointing to the range and bearing. As a means of checking the degree of accuracy of the plotting, the pencil could be made to leave a mark on the plate.

This trainer is of particular value in plotting but it could readily be adapted to other uses. For instance, the "Air Plot" could be replaced with another type of chart, such as a map, and used for other educational or amusement purposes.

Direct action by the instructor is not necessary when reproducer 50 and loudspeaker 52 are used. The instructor merely has to start the reproducer which according to the record employed automatically positions cell 18 in a series of locations for predetermined periods of time. The second channel on the record is synchronized to announce the ranges and bearings corresponding to the locations of the cell 18. This may be done visually or aurally. Actual course and range information from radar equipment may be fed into the plotting device to position the cell 18. In this case, the information is repeated orally from the radar equipment for the benefit of the student.

In the alternative form the device may be used as a course plotter. The light source 53 furnishes a spot of light on the translucent plate 11 which spot will move in accordance with course and range information supplied to the plotting device from an outside source such as radar equipment. The plotter operator marks the location of the light spot at any instant on the plate. Paper may be used over the plate for marking by pencil.

With this plotting mechanism "own ship" can be assumed to be in the center of the plotting area or by suitable electrical units "own ship" can be made to move across the plotting area.

The plotting of other ships' movements can be accomplished by an operator marking the spots on the plate where the light remains for an instant. Various radar equipment tracking various ships may be connected in turn to the plotting device by suitable means. Thus, in sequence, various ranges and bearings are put on the plotting plate as spots of light representing ships and in proper relative position to other ships so that relative speeds and other information can be obtained from the resultant plot.

The invention described herein may be manufactured and used by or for the Government of the United States of America for governmental purposes without the payment of any royalties thereon or therefor.

What is claimed is:

1. An educational device for checking the ability of a student to locate points in an area comprising a manually shiftable source projecting a substantially parallel-ray beam of radiant energy, a mechanically positioned receiver responsive to said beam mounted on an extensible arm supported on a rotatable base for movement to any point in a defined area, the arm and base being independently operated by remote controlled synchromotors and a chart over the area obscuring the view of the receiver but transmitting radiant energy, the beam being pointed at the chart in accordance with data concerning the position of the receiver in order to actuate the receiver.

2. A plotting trainer comprising a movable light source, a translucent plate marked with bearing and range distances about a center, a photoelectric cell mounted beneath the plate for movement to any desired bearing and range by remote controls, reproducing equipment connected to the controls for automatically positioning the cell in a series of locations for predetermined periods of time in accordance with the record reproduced, and synchronized equipment connected with the reproducing equipment for announcing the ranges and bearings corresponding to the locations, the cell being actuated by pointing the light source at the bearing and range on the plate marking the location of the cell.

3. In apparatus of the character described, supporting means; a plot mounted on said means and having on its exposed side a great multiplicity of visible points of known values, said plot being imperforate and non-transparent to the human eye; an electrical unit at the other side in concealment and movable to any conceivable position in proximity thereto, mechanism for shifting said unit to any one of said positions; a second electrical unit manually movable over the first mentioned side of said plot, in circuit with the first mentioned unit and cooperable therewith to control the circuit; and means connected into said circuit and designed to disclose to the operator, whenever he positions the second mentioned unit directly opposite the first named unit, that such positioning has been accurately effected.

4. In the apparatus defined in claim 3, said shifting mechanism comprising an arm pivoted at the center of the plot and movable bodily in a longitudinal direction, and means connecting the first mentioned unit to said arm.

5. In the apparatus defined in claim 4, said electrical units comprising a photoelectric cell and a source of light at opposite sides of the plot, and the last named means comprising a counting device operable by energization of said cell.

6. In the apparatus defined in claim 3, and a record reproducing device arranged in said circuit to cause said mechanism to make a plotting and to announce the location of the point to be plotted.

CYRUS H. FRASER.

REFERENCES CITED

The following references are of record in the file of this patent:

UNITED STATES PATENTS

| Number | Name | Date |
|---|---|---|
| 1,278,395 | Singer | Sept. 10, 1918 |
| 1,585,066 | Wilson | May 18, 1926 |
| 1,915,993 | Handel | June 27, 1933 |
| 1,929,872 | Lavery | Oct. 10, 1933 |
| 2,042,174 | Foisy | May 26, 1936 |
| 2,191,730 | Sjostrand | Feb. 27, 1940 |
| 2,331,337 | Meyer | Oct. 12, 1943 |
| 2,402,162 | Holt | June 18, 1946 |

FOREIGN PATENTS

| Number | Country | Date |
|---|---|---|
| 384,971 | Great Britain | Mar. 6, 1931 |